June 3, 1969     F. H. VAN WINSEN     3,447,796
SPRING SUSPENSION FOR VEHICLE WHEELS
Filed May 7, 1965
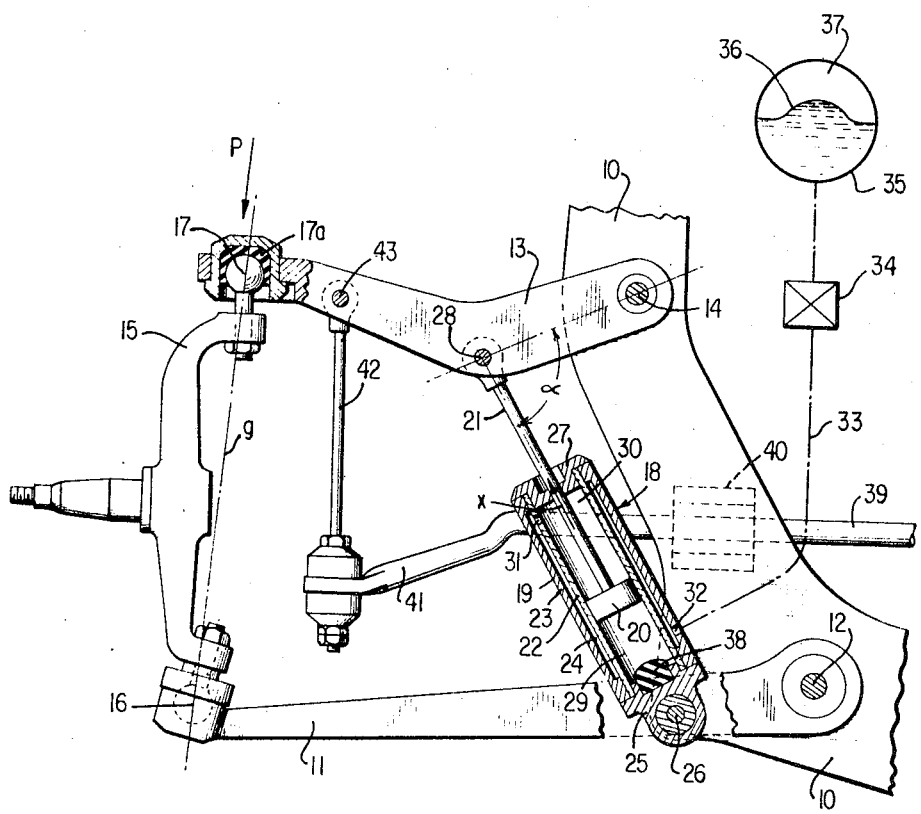
INVENTOR
FRIEDRICH H. VAN WINSEN
BY
ATTORNEYS.

United States Patent Office 3,447,796
Patented June 3, 1969

3,447,796
SPRING SUSPENSION FOR VEHICLE WHEELS
Friedrich H. van Winsen, Kirchheim-Teck, Germany, assignor to Daimler-Benz Aktiengesellschaft, Stuttgart-Unterturkheim, Germany
Filed May 7, 1965, Ser. No. 453,999
Claims priority, application Germany, May 8, 1964,
D 44,361
Int. Cl. B65d 9/14, 9/18, 9/22
U.S. Cl. 267—15                                          18 Claims

ABSTRACT OF THE DISCLOSURE

A spring suspension for motor vehicle wheels, comprising an upper and a lower guide lever and a hydraulic shock absorber which is so connected between the guide levers so as to be lengthened in a telescopic manner when the wheel is deflected upwardly to displace fluid from the shock absorber cylinder.

---

The present invention relates in general to a spring suspension for motor vehicle wheels, particularly those which are suspended at the vehicle superstructure by means of upper and lower guide levers in the form of a four-corner type linkage.

Spring suspensions for vehicle wheels utilizing hydraulic shock absorbers which can be lengthened and shortened telescopically in response to wheel deflections and consist of a displacer piston positioned within a hydraulic cylinder for acting upon the air volume therein are well known; however, shock absorbers of this kind are usually constructed in such a manner that during compression thereof by means of an outside force applied to the vehicle wheel, a fluid is displaced out of the hydraulic cylinder to thereby put the air volume on the other side of the piston under increased pressure by compression. Then, by release of the force acting upon the shock absorber through the vehicle wheel, this compressed air volume pushes the fluid column back to again restore the shock absorber to its extended condition.

The use of such a hydraulic shock absorber with a vehicle suspension acting together with an air volume, is however, in many cases disadvantageous for reasons of space as well as effectiveness. Inasmuch as the air volume must be compressed during spring action resulting from an upward deflection of the vehicle wheel, the shock absorber, in the rest position of the wheel must be made of a relatively great length and is shortened only during the spring action in an upward direction of the wheel. Such an arrangement, however, requires a corresponding construction height which is often not available, or may advantageously be used for other purposes.

The invention aims to avoid these disadvantages by providing a spring suspension wherein a hydraulic shock absorber arrangement having spring characteristics is provided which may be effectively lengthened or shortened telescopically in response to wheel deflection, the shock absorber consisting of a displacer piston and piston rod mounted within cylinder and acting upon an air volume, which shock absorber is connected to a member of the suspension system which swings together with the wheel in such a manner that during spring action of the wheel in an upward direction, the displacer piston of the shock absorber displaces the fluid through compression out of the cylinder space on the piston rod side of the piston so that the shock absorber thereby lengthens itself in a telescope-like manner.

Through the invention, advantage is obtained in that the shock absorber, during an upward spring action of the wheel and by the existing main spring forces, is not placed under compression as in prior art arrangements but is subjected to tension as the shock absorber lengthens itself telescopically. Advantageously, the shock absorber is arranged between two guide levers disposed one above the other and pivotally connected to the vehicle superstructure for guiding the wheel in the form of a four-corner type linkage. The shock absorber being connected preferably in about a diagonal position of the four-corner type linkage in that it is pivotably connected at one side, for example, by means of its piston rod to the upper guide lever and at the other side, for example, by means of the cylinder to the vehicle superstructure or at the lower guide lever in the vicinity of the bearing joint thereof. An especially advantageous space arrangement is obtained therewith.

The shock absorber is disposed between the levers inside the four-corner type linkage and does not extend beyond the upper lever so that it lengthened only with the upward spring action of the wheel corresponding to the change in shape of the four-corner type linkage. As a result of the tension force of the shock absorber acting at the upper guide lever during upward spring action of the wheel, the linkage which connects the guide levers with the wheel carrier or steering pin are simultaneously favorably stressed. Here, the transmitted forces stress the upper ball joint of the wheel carrier from above so that the full cross section of a ball joint may be utilized for the absorption of these forces. The joint may therefore be constructed very simply and of relatively small size.

An especially favorable arrangement of the shock absorber is obtained further when they are pivotally connected to one of the guide levers in such a manner that the angle between the axis of the shock absorber and the connecting line which connects the joint between shock absorber and lever with the joint between lever and vehicle superstructure in the mid-position of the wheel, is about 90° or smaller. Herewith, the advantage is attained that during the upward spring action of the wheel from its mid-position, the softness of the suspension increases in a desired manner.

A further advantageous arrangement of the upper guide lever for the pivotal connection of the shock absorber as well as for space reasons exists therein, that the lever in its center position serving for the pivotal connection of the spring, is bowed downwardly. By this means, the above-mentioned angular position of the shock absorber relative to the upper guide lever is obtained in an especially simple manner and without difficulty and, on the other hand, less space is required by the guide lever also during an upward spring action of the wheel above the lever.

Accordingly, it is an object of the present invention to provide a spring suspension for a vehicle wheel of the type described hereinabove which avoids in a simple and operationally reliable manner the disadvantages encountered with the prior art constructions.

Another object of the instant invention resides in the provision of a spring suspension for vehicle wheels in which a spring-like shock absorber of relatively short length is positioned to be effectively lengthened during upward deflection of the vehicle wheel.

A further object of the instant invention resides in the provision of a suspension for vehicle wheels of the type described hereinabove in which the spring-like shock absorber combination is so positioned that the transmitted forces can be absorbed in a ball joint for the wheel carrier of small size and relatively simple construction.

Still another object of the instant invention resides in the provision of a suspension for vehicle wheels in which a spring-like shock absorber is positioned so as to be loaded primarily in tension in response to deflection of the vehicle wheel.

Still a further object of the instant invention resides in the provision of a spring suspension for vehicle wheels wherein the angle between the upper guide lever and the spring-like shock absorber is such that during upward spring action of the vehicle wheel from its mid-position the softness of the suspension increases in a desirable manner.

A still further object of the instant invention resides in the provision of spring-like shock absorber of such short length as to make possible a bending of the upper guide lever of the suspension system in the direction of the lower guide member thereby considerably reducing the space consumed by the suspension system.

These and other objects, features, and advantages of the present invention will become more obvious from the following description when taken in connection with the accompanying drawing which shows, for purposes of illustration only, an exemplary embodiment in accordance with the present invention, and wherein the sole figure is a partially schematic view of a spring suspension in accordance with the present invention.

Looking to the drawing, at the frame 10, representing a part of the vehicle superstructure or unitary body type supporting construction, the lower guide lever 11 is supported by means of a bearing hinge 12 and the upper guide lever 13 is supported by means of a bearing hinge 14. The bearing hinges 12 and 14 may be constructed as eccentric hinges in the known manner for adjusting the lever. The combination of lower and upper guide levers 11 and 13 with a wheel carrier 15 forms a four-corner type linkage suspension for the vehicle wheel. The wheel carrier 15 is connected with the guide levers 11 and 13 by means of ball and socket joints 16 and 17 in such a manner that the wheel carrier 15 together with the wheel supported thereon may be pivoted in the usual manner about a fixed straight line $g$ passing through the ball and socket joints 17 and 16 providing the necessary steering for the vehicle.

A shock absorber 18 serves for the spring suspension of the wheel and consists essentially of a cylinder 19 and a piston or displacer plunger 20 with the piston rod 21. The cylinder 19 consists of two sleeves 22 and 23 arranged concentrically with each other and matchingly inserted one into the other so as to form an annular space 24 therebetween. The two sleeves 22 and 23 rest on and are sealed by a toggle member 25 which is pivotally supported by means of joint 26 at the frame 10 or the lower guide lever 11 in the vicinity of the bearing hinge 12 of the lower guide lever. At the other end of the cylinder, the sleeves 22 and 23 are closed off by a cover member 27 through which the piston rod 21 extends.

The piston rod 21 is further hinged with its upper end at the guide lever 13 by means of a joint 28, in such a manner, that in the illustrated position, the angle $\alpha$ between the axis of the shock absorber leg and the connecting line between the joints 28 and 14 is appromimately 90° or smaller. The upper guide lever 13 is therewith bowed downwardly with a slightly V-shaped bend, as can be seen in the drawing, so that the piston rod 21 may be pivoted directly at the lever by means of joint 28 and that above the lever, additional space is available for other construction parts of the vehicle.

By means of the piston 20, the inner space of the inner inner sleeve 22 is subdivided into two cylinder chambers 29 and 30 by the piston 20 whereby the chamber 29 may, for example, be filled with air in communication with the atmosphere. The cylinder chamber 30 at the side of the piston rod 21 serving as a displacer chamber is connected with the annular space 24 between the sleeves 22 and 23 by means of a bore 31 in the inner sleeve 22, which annular space 24 itself is connected through a connecting bore 32 in outer sleeve 23 and a line or conduit 33 with a pressure accumulator chamber 35 and a damper or throttle valve 34. By means of a membrane 36 or through an operatively similar element, for example, a piston or the like, the fluid pressure in chamber 35 may act upon the air volume 37 and may decrease it under compression or increase it through expansion.

During spring action of the wheel in an upward direction, the shock absorber 18 is lengthened in a telescope-like manner in that the piston 20 is pulled upwardly in the direction of arrow $x$. By this action, the fluid is displaced out of the cylinder space 30, through ore 31, the annular space 24, and line 33 into the chamber 35 so that the air volume 37 is compressed; that is, the air spring is tensioned which thereby tends to again press the wheel downwardly in relation to the vehicle superstructure. The spring pressure P at the upper joint 17 between the guide lever 13 and the wheel carrier 15 thereby loads the pivot ball of the joint 17, for example, through the joint lining 17a, from above so that for receiving this force P the full cross section of the pivot ball 17 is available. The bearing pressure per unit area may thereby be held relatively low.

During spring action of the wheel in an upwardly direction, the angle $\alpha$ is decreased which corresponds operatively to an increase of the spring softness. At the end of the spring stroke, a rubber bumper or the like (not shown) may be provided in a known manner in order to obtain a progressively quick hardening spring.

During spring action of the wheel in a downward direction, the fluid is again pushed back into the cylinder space 30 which acts as a displacer through the compression pressure of the air volume enclosed in the chamber 37 whereby the piston 20 in cylinder 19 is moved downwardly. The spring suspension of the wheel is thereby limited by means of a rubber bumper 38.

Possibly, also the space or chambers 29 may be filled with a fluid which is displaced in a receiver being under spring pressure or air pressure. The spring pressure produced thereby may, however, be materially smaller than the spring pressure by the air volume 37 in accumulator 35.

The upper guide lever 13 may also serve simultaneously for the connection of a stailizer 39 in the form of a torsion rod, which, for example, is rotatably supported in bearings 40 at the vehicle superstructure and with the lever arm portions 41 hinged at the upper guide lever 13 by means of an intermediate lever or suspension 42 connected to guide lever 13 at pivot 43.

While I have shown and described an exemplary embodiment in accordance with the present invention, it is understood that the same is not limited thereto, but is susceptible of numerous changes and modifications as known to a person skilled in the art, and I therefore do not wish to be limited to the details shown and described herein but intend to cover all such changes and modifications as are encompassed by the scope of the appended claims.

I claim:
1. A spring suspension for wheels, particularly for motor vehicles having a sueprstructure, comprising
   guide lever means pivotally supporting the vehicle wheel at said superstructure, and
   combined shock absorber and spring means including a hydraulic cylinder means and a displacer plunger with a piston rod mounted for sliding movement within said hydraulic cylinder means for acting upon a confined fluid volume,
   said hydraulic cylinder means defining a displacement chamber in communication with a spring chamber containing a resilient medium, said displacement chamber being disposed behind said plunger,
   said combined shock absorber and spring means being connected to said guide lever means such that said displacer plunger is withdrawn from said hydraulic cylinder means in response to upward deflection of said wheel effecting displacement of fluid from said displacement chamber of said hydraulic cylinder means into said spring chamber of said hydraulic cylinder means.

2. A spring suspension for wheels, particularly for motor vehicles having a superstructure, comprising
guide lever means pivotally supporting the vehicle wheel at said superstructure,
shock absorber means including a hydraulic cylinder means and a displacer plunger with a piston rod mounted for sliding movement within said hydraulic cylinder means for acting upon a confined fluid volume,
said shock absorber means being connected to said guide lever means so as to be lengthened in a telescope-like manner in response to upward deflection of said wheel affecting displacement of fluid from said hydraulic cylinder means on one side of said displacer plunger,
said guide lever means including upper and lower guide levers and a wheel carrier arranged with said vehicle superstructure in the form of a four-corner type linkage, said shock absorber means being pivotally connected diagonally between said upper and lower guide levers with said piston rod being connected to said upper guide lever and said hydraulic cylinder means being connected to said lower guide lever adjacent to the point of pivotal connection thereof to said vehicle superstructure.

3. A spring suspension according to claim 1, wherein said guide lever means includes upper and lower guide levers and a wheel carrier arranged with said vehicle superstructure in the form of a four-corner type linkage, said combined shock absorber and spring means being pivotally connected diagonally between said upper and lower guide levers with said piston rod being connected to said upper guide lever and said hydraulic cylinder means being connected to said lower guide lever adjacent to the point of pivotal connection thereof to said vehicle superstructure,
said combined shock absorber and spring means being pivotally connected to one guide lever of said guide lever means with the angle between the axis of said combined shock absorber and spring means and the line of connection between the pivot point of said combined shock absorber and spring means at said one guide lever and the pivot point of said one guide lever at said superstructure being approximately 90° in the static position of said wheel.

4. A spring suspension for wheels, particularly for motor vehicles having a superstructure, comprising
guide lever means pivotally supporting the vehicle wheel at said superstructure,
shock absorber means including a hydraulic cylinder means and a displacer plunger with a piston rod mounted for sliding movement within said hydraulic cylinder means for acting upon a confined fluid volume,
said shock absorber means being connected to said guide lever means so as to be lengthened in a telescope-like manner in response to upward deflection of said wheel effecting displacement of fluid from said hydraulic cylinder means on one side of said displacer plunger,
said guide lever means including upper and lower guide levers and a wheel carrier arranged with said vehicle superstructure in the form of a four-corner type linkage, said shock absorber means being pivotally connected diagonally between said upper and lower guide levers with said piston rod being connected to said upper guide lever and said hydraulic cylinder means being connected to said lower guide lever adjacent to the point of pivotal connection thereof to said vehicle superstructure,
said shock absorber means being pivotally connected to one guide lever of said guide lever means with the angle between the axis of said shock absorber means and the line of connection between the pivot point of said shock absorber means at said one guide lever and the pivot point of said one guide lever at said superstructure being approximately 90° in the static position of said wheel,
the center portion of said one guide lever being angularly bent at the point of connection with said shock absorber means in the direction of said other guide lever.

5. A spring suspension for wheels, particularly for motor vehicles having a superstructure, comprising
guide lever means pivotally supporting the vehicle wheel at said superstructure,
shock absorber means including a hydraulic cylinder means and a displacer plunger with a piston rod mounted for sliding movement within said hydraulic cylinder means for acting upon a confined fluid volume,
said shock absorber means being connected to said guide lever means so as to be lengthened in a telescope-like manner in response to upward deflection of said wheel effecting displacement of fluid from said hydraulic cylinder means on one side of said displacer plunger,
said guide lever means including upper and lower guide levers and a wheel carrier arranged with said vehicle superstructure in the form of a four-corner type linkage, said shock absorber means being pivotally connected diagonally between said upper and lower guide levers with said piston rod being connected to said upper guide lever and said hydraulic cylinder means being connected to said lower guide lever adjacent to the point of pivotal connection thereof to said vehicle superstructure,
said shock absorber means being pivotally connected to one guide lever of said guide lever means with the angle between the axis of said shock absorber means and the line of connection between the pivot point of said shock absorber means at said one guide lever and the pivot point of said one guide lever at said superstructure being approximately 90° in the static position of said wheel,
the center portion of said one guide lever being angularly bent at the point of connection with said shock absorber means in the direction of said other guide lever,
said hydraulic cylinder means including an elastic bumper means mounted therein on the side of said displacer plunger opposite said piston rod for limiting the stroke of said plunger.

6. A spring suspension for wheels, particularly for motor vehicles having a superstructure, comprising
guide lever means pivotally supporting the vehicle wheel at said superstructure,
shock absorber means including a hydraulic cylinder means and a displacer plunger with a piston rod mounted for sliding movement within said hydraulic cylinder means for acting upon a confined fluid volume,
said shock absorber means being connected to said guide lever means so as to be lengthened in a telescope-like manner in response to upward deflection of said wheel effecting displacement of fluid from said hydraulic cylinder means on one side of said displacer plunger,
said guide lever means including upper and lower guide levers and a wheel carrier arranged with said vehicle superstructure in the form of a four-corner type linkage, said shock absorber means being pivotally connected diagonally between said upper and lower guide levers with said piston rod being connected to said upper guide lever and said hydraulic cylinder means being connected to said lower guide lever adjacent to the point of pivotal connection thereof to said vehicle superstructure, said shock absorber means being pivotally connected to one guide lever of said guide lever means with the angle between the axis of said shock absorber means and the line of connection between the pivot point of said shock absorber means at said one guide lever and the pivot point of said one guide lever at said superstructure being approximately 90° in the static position of said wheel, the center portion of said one guide lever being angularly bent at the point of connection with said shock absorber means in the direction of said other guide lever, said hydraulic cylinder means including an elastic bumper means mounted therein on the side of said displacer plunger opposite said piston rod for limiting the stroke of said plunger, said hydraulic cylinder means further includes first and second concentric cylindrical sleeves forming an annular space between said sleeves with said displacer plunger accommodated within said inner sleeve, and a passage interconnecting said annular space and the portion of said inner sleeve on the side of said displacer plunger accommodating said piston rod.

7. A spring suspension for wheels, particularly for motor vehicles having a superstructure, comprising guide lever means pivotally supporting a vehicle wheel at said superstructure, shock absorber means including a hydraulic cylinder means and a displacer plunger with a piston rod mounted for sliding movement within said hydraulic cylinder means for acting upon a confined fluid volume, said shock absorber means being connected to said guide lever means so as to be lengthened in a telescope-like manner in response to upward deflection of said wheel effecting displacement of fluid from said hydraulic cylinder means on one side of said displacer plunger, said guide lever means including upper and lower guide levers and a wheel carrier arranged with said vehicle superstructure in the form of a four-corner type linkage, said shock absorber means being pivotally connected diagonally between said upper and lower guide levers with said piston rod being connected to said upper guide lever and said hydraulic cylinder means being connected to said lower guide lever adjacent to the point of pivotal connection thereof to said vehicle superstructure, said shock absorber means being pivotally connected to one guide lever to said guide lever means with the angle between the axis of said shock absorber means and the line of connection between the pivot point of said shock absorber means at said one guide lever and the pivot point of said one guide lever at said superstructure being approximately 90° in the static position of said wheel, the center portion of said one guide lever being angularly bent at the point of connection with said shock absorber means in the direction of said other guide lever, said hydraulic cylinder means including an elastic bumper means mounted therein on the side of said displacer plunger opposite said piston rod for limiting the stroke of said plunger, said hydraulic cylinder means further includes first and second concentric cylindrical sleeves forming an annular space between said sleeves with said displacer plunger accommodated within said inner sleeve, and a passage interconnecting said annular space and the portion of said inner sleeve on the side of said displacer plunger accommodating said piston rod, torsion stabilizer means connected between said one guide lever and said superstructure.

8. A spring suspension for wheels, particulary for motor vehicles having a superstructure comprising guide lever means pivotally supporting the vehicle wheel at said superstructure, shock absorber means including a hydraulic cylinder means and a displacer plunger with a piston rod mounted for sliding movement within said hydraulic cylinder means for acting upon a confined fluid volume, said shock absorber means being connected to said guide lever means so as to be lengthened in a telescope-like manner in response to upward deflection of said wheel effecting displacement of fluid from said hydraulic cylinder means on one side of said displacer plunger, said guide lever means including upper and lower guide levers and a wheel carrier arranged with said vehicle superstructure in the form of a four-corner type linkage, said shock absorber means being pivotally connected diagonally between said upper and lower guide levers with said piston rod being connected to said upper guide lever and said hydraulic cylinder means being connected to said lower guide lever adjacent to the point of pivotal connection thereof to said vehicle superstructure, said shock absorber means being pivotally connected to one guide lever of said guide lever means with the angle between the axis of said shock absorber means and the line of connection between the pivot point of said shock absorber means at said one guide lever and the pivot point of said one guide lever at said superstructure being approximately 90° in the static position of said wheel, the center portion of said one guide lever being angularly bent at the point of connection with said shock absorber means in the direction of said other guide lever, said hydraulic cylinder means including an elastic bumper means mounted therein on the side of said displacer plunger opposite said piston rod for limiting the stroke of said plunger, said hydraulic cylinder means further includes first and second concentric cylindrical sleeves forming an annular space between said sleeves with said displacer plunger accommodated within said inner sleeve, and a passage interconnecting said annular space and the portion of said inner sleeve on the side of said displacer plunger accommodating said piston rod, fluid accumulator means connected to said annular space for opposing movement of said displacer plunger in response to upward deflection of said wheel.

9. A spring suspension for wheels, particularly for motor vehicles having a superstructure, comprising guide lever means pivotally supporting the vehicle wheel at said superstructure, shock absorber means including a hydraulic cylinder means and a displacer plunger with a piston rod mounted for sliding movement within said hydraulic cylinder means for acting upon a confined fluid volume, said shock absorber means being connected to said guide lever means so as to be lengthened in a telescope-like manner in response to upward deflection of said wheel effecting displacement of fluid from said hydraulic cylinder means on one side of said displacer plunger, said guide lever means including upper and lower guide levers and a wheel carrier arranged with said vehicle superstructure in the form of a four-corner type linkage, said shock absorber means being pivotally connected diagonally between said upper and lower guide levers with said piston rod being connected to said upper guide lever and said hydraulic cylinder means being connected to said lower guide lever adjacent to the point of pivotal connection thereof to said vehicle superstructure, the center portion of said one guide lever being angularly bent at the point of connection with said shock absorber means in the direction of said other guide levers, said hydraulic cylinder means including an elastic bumper means mounted therein on the side of said displacer plunger opposite said piston rod for limiting the stroke of said plunger, said hydraulic cylinder means further includes first and second concentric cylindrical sleeves forming an annular space between said sleeves with said displacer plunger accommodated within said inner sleeve, and a passage interconnecting said annular space and the portion of said inner sleeve on the side of said displacer plunger accommodating said piston rod.

10. A spring suspension for wheels, particularly for motor vehicles having a superstructure, comprising guide lever means pivotally supporting the vehicle wheel at said superstructure, shock absorber means including a hydraulic cylinder means and a displacer plunger with a piston rod mounted for sliding movement within said hydraulic cylinder means for acting upon a confined fluid volume, said shock absorber means being connected to said guide lever means so as to be lengthened in a telescope-like manner in response to upward deflection of said wheel effecting displacement of fluid from said hydraulic cylinder means on one side of said displacer plunger, said guide lever means including upper and lower guide levers and a wheel carrier arranged within said vehicle superstructure in the form of a four-corner type linkage, said shock absorber means being pivotally connected diagonally between said upper and lower guide levers with said piston rod being connected to said upper guide lever and said hydraulic cylinder means being connected to said lower guide lever adjacent to the point of pivotal connection thereof to said vehicle superstructure, said hydraulic cylinder means including an elastic bumper means mounted therein on the side of said displacer plunger opposite said piston rod for limiting the stroke of said plunger, said hydraulic cylinder means further includes first and second concentric cylindrical sleeves forming an annular space between said sleeves with said displacer plunger accommodated within said inner sleeve and a passage interconnecting said annular space and the portion of said inner sleeve on the side of said displacer plunger accommodating said piston rod, fluid accumulator means connected to said annular space for opposing movement of said displacer plunger in response to upward deflection of said wheel.

11. A spring suspension for wheels, particularly for motor vehicles having a superstructure, comprising lever guide means for pivotally supporting said wheel at said vehicle superstructure in the form of four-corner type linkage including upper and lower guide levers, shock absorber means connected to said upper guide lever at a point thereof which cooperates with the deflections of said wheel for biasing said lever guide means into a neutral position in a spring-like manner in response to wheel deflection.

12. A spring suspension for wheels, particularly for motor vehicles having a superstructure, comprising lever guide means for pivotally supporting said wheel at said vehicle superstructure in the form of four-corner type linkage including upper and lower guide levers, combined shock absorber and spring means connected to said upper guide lever at a point thereof which cooperates with the deflections of said wheel for biasing said lever guide means into a neutral position in a spring-like manner in response to wheel deflection, said combined shock absorber and spring means including a hydraulic cylinder and a piston with a piston rod mounted for sliding movement therein, said hydraulic cylinder being divided by said piston into first and second chambers with said first chamber forming a sealed enclosure and pressure accumulator means positioned at a point remote from said cylinder and operatively connected to said second chamber of said cylinder for effectively lengthening said combined shock absorber and spring means in response to wheel deflections producing compression in said second chamber.

13. A spring suspension according to claim 12, wherein said hydraulic cylinder is formed of a pair of concentric sleeves providing an annular space therebetween with said piston being accommodated within the inner sleeve of said pair of concentric sleeves and the outer sleeve thereof being sealed at its ends to said inner sleeve and forming a sealed interconnection between said second chamber and said pressure accumulator means.

14. A spring suspension for wheels, particularly for motor vehicles having a superstructure, comprising lever guide means for pivotally supporting said wheel at said vehicle superstructure in the form of four-corner type linkage including upper and lower guide levers, shock absorber means connected to said upper guide lever at a point thereof which cooperates with the deflections of said wheel for biasing said lever guide means into a neutral position in a spring-like manner in response to wheel deflection, said shock absorber means including a hydraulic cylinder and a piston with a piston rod mounted for sliding movement therein, said hydraulic cylinder being divided by said piston into first and second chambers with said first chamber forming a sealed enclosure and pressure accumulator means positioned at a point remote from said cylinder and operatively connected to said second chamber of said cylinder for effectively lengthening said shock absorber means in response to wheel deflections producing compression in said second chamber, said hydraulic cylinder being formed of a pair of concentric sleeves providing an annular space therebetween with said piston being accommodated within the inner sleeve of said pair of concentric sleeves and the outer sleeve thereof being sealed at its ends to said inner sleeve and forming a sealed interconnection between said second chamber and said pressure accumulator means, an elastic bumper mounted within said first chamber at the extreme end of said hydraulic cylinder for limiting the stroke of said piston in response to wheel deflection.

15. A spring suspension for wheels, particularly for motor vehicles having a superstructure, comprising lever guide means for pivotally supporting said wheel at said vehicle superstructure in the form of four-corner type linkage including upper and lower guide levers, shock absorber means connected to said upper guide lever at a point thereof which cooperates with the deflections of said wheel for biasing said lever guide means into a neutral position in a spring-like manner in response to wheel deflection, said shock absorber means including a hydraulic cylinder and a piston with a piston rod mounted for sliding movement therein, said hydraulic cylinder being divided by said piston into first and second chambers with said first chamber forming a sealed enclosure and pressure accumulator means positioned at a point remote from said cylinder and operatively connected to said second chamber of said cylinder for effectively lengthening said shock absorber means in response to wheel deflections producing compression in said second chamber, said hydraulic cylinder being formed of a pair of concentric sleeves providing an annular space therebetween with said piston being accommodated within the inner sleeve of said pair of concentric sleeves and the outer sleeve thereof being sealed at its ends to said inner sleeve and forming a sealed interconnection between said second chamber and said pressure accumulator means.

an elastic bumper mounted within said first chamber at the extreme end of said hydraulic cylinder for limiting the stroke of said piston in response to wheel deflection, said shock absorber means being connected to said lever guide means with said piston rod being connected to said upper guide lever and said cylinder being connected to said lower guide lever at points thereon providing a substantially diagonal orientation of said shock absorber means with respect to said lever guide means.

16. A combined shock absorber and spring system for motor vehicles exhibiting spring-like characteristics comprising a hydraulic cylinder and a piston with a piston rod mounted for sliding movement therein, said hydraulic cylinder being divided by said piston into first and second chambers with said first chamber forming a sealed enclosure, and pressure accumulator means positioned at a point remote from said cylinder and operatively connected to said second chamber of said cylinder for effectively lengthening said shock absorber means in response to movement of said piston producing compression in said second chamber, said hydraulic cylinder being formed of a pair of concentric sleeves providing an annular space therebetween with said piston being accommodated within the inner sleeve of said pair of concentric sleeves and the outer sleeve thereof being sealed at its ends to said inner sleeve and forming a sealed interconnection between said second chamber and said pressure accumulator means.

17. A combined shock absorber and spring system according to claim 16, further comprising an elastic bumper mounted within said first chamber at the extreme end of said hydraulic cylinder for limiting the stroke of said piston in response to wheel deflection.

18. A shock absorber system for motor vehicles exhibiting spring-like characteristics comprising a hydraulic cylinder and a piston with a piston rod mounted for sliding movement therein, said hydraulic cylinder being divided by said piston into first and second chambers with said first chamber forming a sealed enclosure, and pressure accumulator means positioned at a point remote from said cylinder and operatively connected to said second chamber of said cylinder for effectively lengthening said shock absorber means in response to movement of said piston producing compression in said second chamber.

References Cited

UNITED STATES PATENTS

| 2,856,035 | 10/1958 | Rohacs | 267—64 |
| 2,896,940 | 7/1959 | Lightbourn | 267—20 |
| 2,973,195 | 2/1961 | Armstrong | 267—13 |
| 3,145,985 | 8/1964 | De Carbon | 267—64 |

ARTHUR T. LA POINT, *Primary Examiner.*

R. A. BERTSCH, *Assistant Examiner.*